(12) United States Patent
Kim et al.

(10) Patent No.: US 7,601,926 B2
(45) Date of Patent: Oct. 13, 2009

(54) KEYPAD WITH PHOSPHOR, KEYPAD ASSEMBLY AND PORTABLE TERMINAL

(75) Inventors: Kyoung-Youm Kim, Seoul (KR); Joo-Hoon Lee, Yongin-si (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 190 days.

(21) Appl. No.: 11/517,897

(22) Filed: Sep. 8, 2006

(65) Prior Publication Data

US 2007/0068783 A1    Mar. 29, 2007

(30) Foreign Application Priority Data

Sep. 27, 2005   (KR)   .................. 10-2005-0089960

(51) Int. Cl.
    *H01H 9/00*     (2006.01)

(52) U.S. Cl. ........................................ 200/310; 200/314

(58) Field of Classification Search ......... 200/310–317; 345/168–172; 362/23, 26, 27, 615, 616
See application file for complete search history.

(56) References Cited

U.S. PATENT DOCUMENTS

| | | | | | |
|---|---|---|---|---|---|
| 5,477,430 | A | * | 12/1995 | LaRose | 362/84 |
| 6,036,326 | A | * | 3/2000 | Yoshikawa et al. | 362/23 |
| 7,186,935 | B2 | * | 3/2007 | Lee et al. | 200/310 |
| 2006/0254894 | A1 | * | 11/2006 | Jung et al. | 200/314 |
| 2006/0260923 | A1 | * | 11/2006 | Lee et al. | 200/314 |
| 2007/0068783 | A1 | * | 3/2007 | Kim et al. | 200/310 |

FOREIGN PATENT DOCUMENTS

| | | |
|---|---|---|
| JP | 2002-300258 | 10/2002 |
| KR | 2000-47226 | 7/2000 |
| KR | 10-606081 | 7/2006 |
| KR | 10-606082 | 7/2006 |

* cited by examiner

*Primary Examiner*—Lincoln Donovan
*Assistant Examiner*—Marina Fishman
(74) *Attorney, Agent, or Firm*—Cha & Reiter, LLC

(57) ABSTRACT

A keypad having a phosphor is disclosed. The keypad includes a light guide panel, the interior of which ultraviolet light propagates through; and at least one key top disposed on top of the light guide panel including a phosphor to absorb the ultraviolet light passing out through the light guide panel and emit visible light.

22 Claims, 5 Drawing Sheets ns 130 projected downwardly from a lower surface 124 of
KEYPAD WITH PHOSPHOR, KEYPAD ASSEMBLY AND PORTABLE TERMINAL

CLAIM OF PRIORITY

This application claims the benefit of the earlier filing date of that patent application entitled "Keypad with Phosphor, Keypad Assembly and Mobile Terminal," filed with the Korean Intellectual Property Office on Sep. 27, 2005 and assigned Serial No. 2005-89960, the contents of which are incorporated herein by reference.

BACKGROUND OF THE INVENTION

1. Field of the Invention

The present invention relates to a keypad used in a portable terminal, and more particularly to a keypad with a light guide panel and a keypad assembly.

2. Description of the Related Art

Generally, a keypad used in a portable terminal includes a plate-shaped elastic pad, a plurality of key tops disposed on the upper surface of the elastic pad with numbers and characters printed on the upper surface thereof, respectively, and a plurality of protrusions (or actuators) projected downwardly from a lower surface of the elastic pad. In addition, the typical keypad has a plurality (generally 15 to 20) of light emitting devices for backlighting the keypad.

FIG. 1 is a cross-sectional view of a keypad assembly in the prior art. The keypad assembly 100 includes a keypad 110, a switch board 150 and a plurality of light emitting diodes (LEDs) 170.

The keypad 110 includes a plate-shaped elastic pad 120, a plurality of key tops 140 formed on an upper surface 122 of the elastic pad 120 with numbers and characters printed on the upper surface thereof, respectively, and a plurality of protrusions 130 projected downwardly from a lower surface 124 of the elastic pad 120. Each of the protrusions 130 is aligned with the center of the corresponding key tops 140. Also, the elastic pad 120 has a plurality of grooves 126 on the lower surface 124 thereof. The grooves 126 are positioned around the respective protrusions 130 to prevent the LEDs 170 from interfering with the protrusions 130.

The switch board 150 includes a plate-shaped PCB (printed circuit board) 155 and a plurality of switches 160 formed on the upper surface of the PCB 155 that faces the keypad 110. Each switch 160 consists of a conductive contact member 162 and a conductive dome 164 that completely covers the contact member 162.

The plurality of LEDs 170 are mounted on the upper surface of the PCB 155 and covered by the corresponding grooves 126 of the elastic pad 120.

When a user presses a specific key top 140, a portion of the keypad 110 below the pressed key top 140 is deformed towards the switch board 150. As a result, a corresponding protrusion 130 formed at the deformed portion of the keypad 110 presses a corresponding dome 164 which will then be in electrical contact with a corresponding contact member 162.

For the normal operation of the switches 160, the LEDs 170 cannot be placed right below the key tops 140. Since visible light emitted from the LEDs 170 passes through the elastic pad 120 and illuminates the key tops 140 at an oblique angle, each key top 140 itself is indirectly and unevenly illuminated. Accordingly, the center of each key top 140 is relatively dark, while the perimeter is bright. A larger number of LEDs may be mounted to more uniformly and brightly illuminate the key tops 140, which however increases power consumption and cost of manufacture.

Since the visible light emitted from the LEDs 170 leaks out to the upper surface 122 of the elastic pad, it may deteriorate the appearance of the keypad assembly 100. Particularly, if the keypad assembly is mounted within a thin and bright-colored housing, the degree of light leakage will be increased. Although various mechanical solutions, such as a black printed film, have been suggested, none of them is completely satisfactory to solve the light leakage problem.

SUMMARY OF THE INVENTION

Accordingly, the present invention has been made to solve the above-mentioned problems occurring in the prior art and provides additional advantages, by providing a keypad for meeting the needs for uniform and bright illumination, power saving and low-cost manufacture, a keypad assembly and a portable terminal with the keypad.

One aspect of the present invention is to provide a keypad and a keypad assembly capable of preventing visible light from leaking out through the perimeters of key tops and solving problems caused by light leakage.

In one embodiment, there is provided a keypad comprising a light guide panel, the interior of which ultraviolet light propagates through and at least one key top disposed on an upper surface of the light guide panel to absorb the ultraviolet light passing out through the light guide panel and emitted as visible light.

In another embodiment, there is provided a keypad comprising: a light guide panel, the interior of which ultraviolet light propagates through, at least one key top disposed on an upper surface of the light guide panel to absorb the ultraviolet light passing out through the light guide panel and emitting visible light and at least one reflective pattern formed on the light guide panel to reflect a part of the ultraviolet light propagating inside the light guide panel towards the key top.

In another embodiment, there is provided a keypad assembly comprising a keypad having a light guide panel, the interior of which ultraviolet light propagates through, and at least one key top disposed on an upper surface of the light guide panel to absorb the ultraviolet light passing out through the light guide panel and emitting visible light, a light emitting device for coupling the ultraviolet light into the light guide panel; and a switch board having at least one switch formed on its upper surface facing the keypad, wherein as the key top is pressed, a portion of the keypad is deformed towards the switch board and activates the switch.

In yet another embodiment, there is provided a portable terminal with a keypad assembly comprising a keypad having a light guide panel, the interior of which ultraviolet light propagates through, and at least one key top disposed on an upper surface of the light guide panel to absorb the ultraviolet light passing out through the light guide panel and emitting visible light, a light emitting device for coupling the ultraviolet light into the light guide panel, and a switch board having at least one switch formed on its upper surface facing the keypad, wherein as the key top is pressed, a portion of the keypad is deformed towards the switch board and activates the switch.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
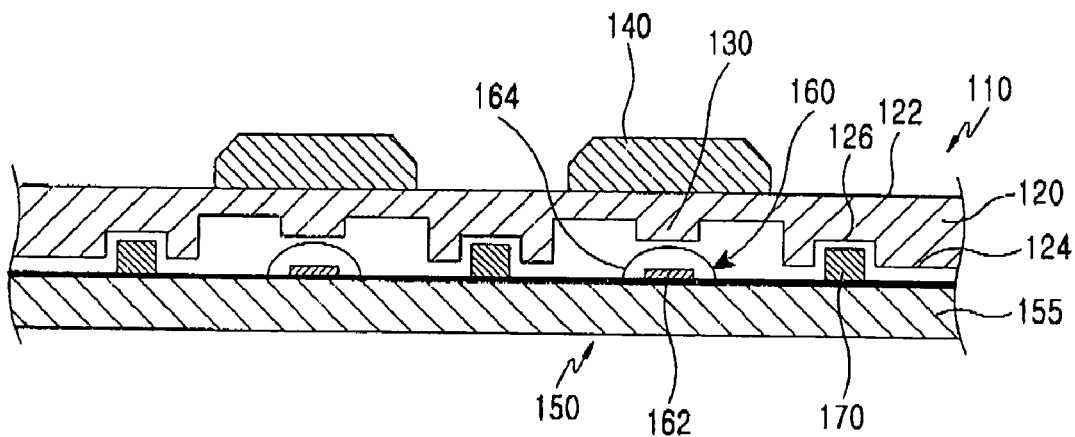
FIG. 1 is a cross-sectional view of a keypad assembly in the prior art.
Figure 2:
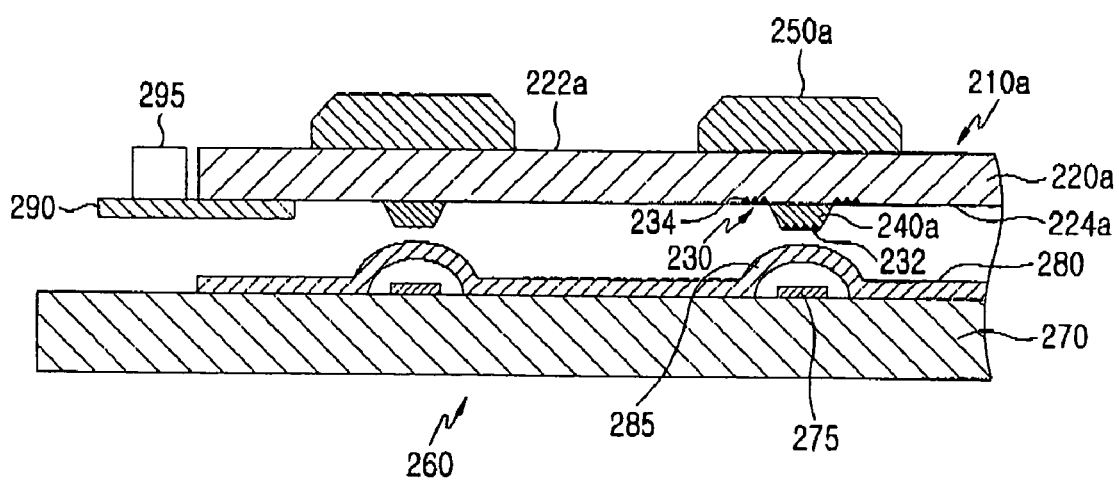
FIG. 2 is a cross-sectional view of a keypad assembly according to a first embodiment of the present invention.
Figure 3:
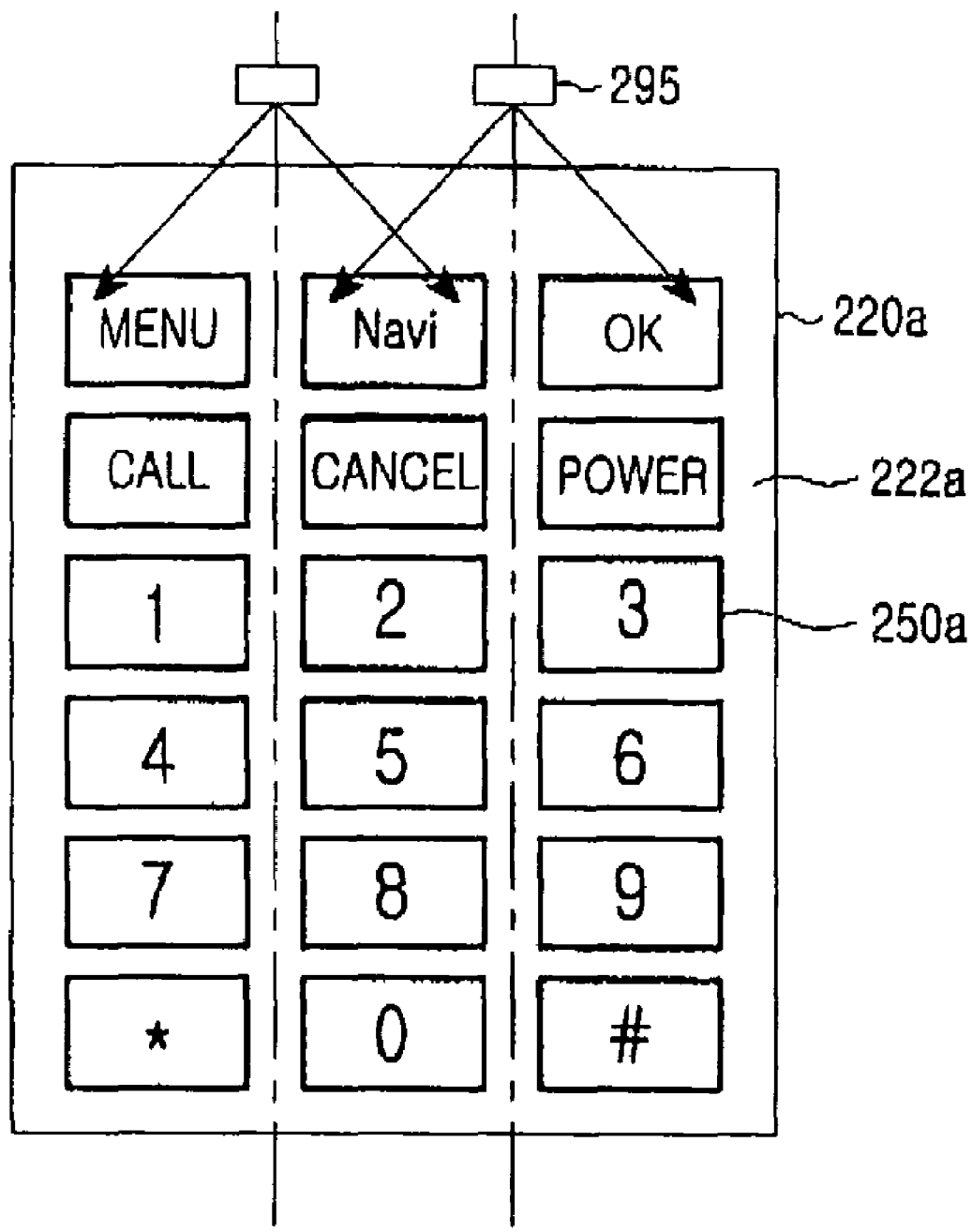
FIG. 3 is a plan view of part of the keypad assembly in FIG. 2.

FIG. 2 is a cross-sectional view of a keypad assembly according to a first embodiment of the present invention. FIG. 3 is a plan view of part of the keypad assembly in FIG. 2. The keypad assembly 200 includes a keypad 210a, a switch board 260 facing the keypad 210a (preferably, being in contact with protrusions 240a of the keypad 210a), a plurality of light emitting devices 295 and an auxiliary printed circuit board 290.

The keypad 210a includes a light guide panel 220a, a plurality of key tops 250a, a plurality of protrusions 240a and a plurality of reflective patterns 230.

The light guide panels 220a guides ultraviolet light coupled into the interior thereof. The coupled ultraviolet light propagates from one side to the other in the light guide panel 220a. The light guide panel 220a can be in any shape including a square shape. The ultraviolet light coupled into the interior of the light guide panel 220a propagates within the light guide panel 220a due to substantially total internal reflection at a border between the light guide panel 220a and the outside air layer. The light guide panel 220a has elasticity that makes any pressed key top 250a return to its original position. In other words, the light guide panel 220a is restored substantially immediately after deformation due to its intrinsic restoring force, thereby returning the pressed key top 250a to it original position.

The light guide panel 220a is made from a high transparent elastomer material having low hardness, high elastic strain, high elastic restoring force and high UV transmissivity in order to give a user soft feeling when pressing the key tops 250a, to inhibit interference between the key tops 250a and to prevent any permanent deformation due to repeated key pressings. Preferably, the light guide panel 220a is made from polyurethane or silicone.

The plurality of key tops 250a are disposed on an upper surface 222a of the light guide panel 220a and have numbers, characters, symbols and/or figures printed on the upper surface thereof, respectively. Each key top 250a is made from a phosphor material to absorb ultraviolet light and emit visible light. The key tops 250a can be fixed to the upper surface 222a of the light guide panel 220a using an adhesive. The key tops 250a are molded from a conventional phosphor material or a mixture obtained by adding a phosphor material to a transparent liquid elastomer material, polycarbonate or an acrylic resin. An electron in a phosphor becomes excited after absorption of ultraviolet light. When the electron in the excited state falls back to the ground state, it emits visible light. Fluorescence occurs due to the visible light being emitted while the electron undergoes a transition from the excited state to the ground state or from the excited state to the metastable state and then to the ground state. Phosphor materials include $BaMgAl_{10}O_{17}:Eu$, $Zn_2SiO_4:Mn$, $(Y,Gd)BO_3:Eu$, $Gd_2O_2S:Tb$, $Gd_2O_2S:Eu$, $Gd_2O_2S:Pr$, $Gd_2O_2S:Pr,Ce,F$, $Y_2O_2S:Tb$, $Y_2OvS:Eu$, $Y_2O_2S:Pr$ and $MgWO_4$.

In the keypad 210a, key tops provided relatively close to the light emitting devices 295 may have a different phosphor density or volume than those relatively remote from the light emitting devices 295 in order to uniformly illuminate the overall key tops on the light guide panel 220a, regardless of the distance from the light emitting devices 295. To be specific, key tops closer to the light emitting devices 295 generally have a larger amount of light illuminated. Therefore, when the key tops relatively close to the light emitting devices 295 have a lower phosphor density and the relatively remote key tops a higher phosphor density, the overall illumination of light on the key tops 250a will become even.

The plurality of protrusions 240a are formed on a lower surface 224a of the light guide panel 220a. The protrusions 240a which are made from the same material as the light guide panel 220a or a different material can be integrally formed with the light guide panel 220a. Alternatively, separately formed protrusions 240a can be fixed to the lower surface 224a of the light guide panel 220a. The protrusions 240a are arrayed below the corresponding key tops 250a (in a direction of the thickness of the keypad assembly 200 or in a direction perpendicular to the upper surface of a main printed circuit board 270).

The plurality of reflective patterns 230 are formed on the lower surface 224a of the light guide panel 220a to reflect a part of the ultraviolet light propagating inside the light guide panel 220a towards the key tops 250a. If necessary, the reflective patterns 230 can be formed on the upper surface 222a of the light guide panel 220a. According to a preferred embodiment of the present invention, the reflective patterns 230 are provided on the protrusions 240a below the key tops 250a and around the protrusions 240a for the uniform illumination of the key tops 250a. In order to uniformly illuminate the overall key tops on the light guide panel 220a regardless of the distance from the light emitting devices 295, reflective patterns provided below the key tops relatively close to the light emitting devices 295 may have a different density or size than those provided below the key tops relatively remote from the light emitting devices 295. To be specific, portions closer to the light emitting devices 295 generally have a larger amount of light illuminated. Therefore, the overall illumination of light on the key tops 250a will become even if the reflective patterns provided below the key tops close to the light emitting devices 295 have a lower density and those provided below the key tops remote from the light emitting devices 295 have a higher density.

The reflective patterns 230 consists of central patterns 232 formed on the lower surface of the protrusions 240a and peripheral patterns 234 formed around the protrusions 240a. Ultraviolet light propagating inside the light guide panel 220a is incident on the reflective patterns 230. Most ultraviolet light diffusely reflected towards a specific key top 250a by the reflective patterns 230 pass through the upper surface 222a of the light guide panel 220a because the total internal reflection condition (that the angle of incidence should be smaller than a critical angle) is not met. Ultraviolet light passing without being diffusely reflected by the reflection patterns 230 and part of the diffuse-reflected ultraviolet light continue propagating inside the light guide panel 220a and contribute to the illumination of the other key tops 250a. In other words, the reflective patterns 230 cause diffuse reflection so as to use only part of the incident ultraviolet light to illuminate a single key top and the remaining incident ultraviolet light to illuminate the other key tops 250a. The reflective patterns 230 enable uniform illumination of the key tops 250a through diffuse reflection in various directions. Preferably, the reflective patterns 230 should be formed by scratch, print or the like.

It is possible to form the central patterns 232 of the reflective patterns 230 between the light guide panel 220a and each protrusion 240a, rather than on the lower surface of each protrusion 240a. After formation of the central patterns 232 by scratching the lower surface 224a of the light guide panel 220a, each protrusion 240a can be fixed to the central pattern 232 formed as such.

It is also possible to remove the reflective patterns 230 and provide key tops 250a having a refractive index sufficient to nullify or absorb the total internal reflection of ultraviolet light propagating inside the light guide panel 220a. In other words, the key tops 250a can have a refractive index which is equal or close to the refractive index of the light guide panel 220a.

The switch board 260 includes a main printed circuit board 270 and a dome sheet 280.

The main printed circuit board 270 has a plurality of conductive contact members 275 and a plurality of domes 285 for covering the conductive contact members 275. Each pair of a contact member 275 and a corresponding dome 285 form a switch 275, 285 arrayed below the corresponding protrusion 240a.

The dome sheet 280 attached to the upper surface of the main printed circuit board 270 has the plurality of domes 285. Each dome 285 completely covers the corresponding contact member 275.

When a user presses a specific key top 250a, a portion of the keypad 210a below the pressed key top 250a is deformed towards the switch board 260. As a result, a corresponding protrusion 240a formed at the deformed portion of the keypad 210a presses a corresponding dome 285 which will then be in electrical contact with a corresponding contact member 275.

The auxiliary printed circuit board 290 is attached to an end portion of the lower surface 224a of the light guide panel 220a. The plurality of light emitting devices 295 are mounted on the auxiliary printed circuit board 290 in such a manner that their light emitting sides can face one longitudinal end of the light guide panel 220a. Ultraviolet light emitted from the light emitting devices are coupled into the interior of the light guide panel 220a through the lateral side of the light guide panel 220a. The auxiliary printed circuit board 290 can be a flexible printed circuit board (FPCB). Also, general UV emitting diodes can be used as the light emitting devices 295.

As explained above, the keypad assembly 200 has key tops 250a made from a phosphor material. Although some of the ultraviolet light emitted from the light emitting devices 295 are not coupled into the light guide panel 220a or leak through a lateral side of the light guide panel 220a or through any unintended portion, such ultraviolet light are invisible to the human eye. Therefore, the keypad assembly 200 can completely solve problems that may be caused by the light leakage.

In accordance with the first embodiment of the present invention, each key top 250a itself is made from a phosphor material. Instead of providing key tops made from a phosphor material, it is possible to deposit a phosphor on the upper surface of each key top. The phosphor can be deposited on the upper surface of the light guide panel or a supporting film so that it can be placed on each key top. Alternatively, the phosphor can be formed in shape of a character, number, symbol or figure to be deposited on the upper surface of each key top.

Figure 4:
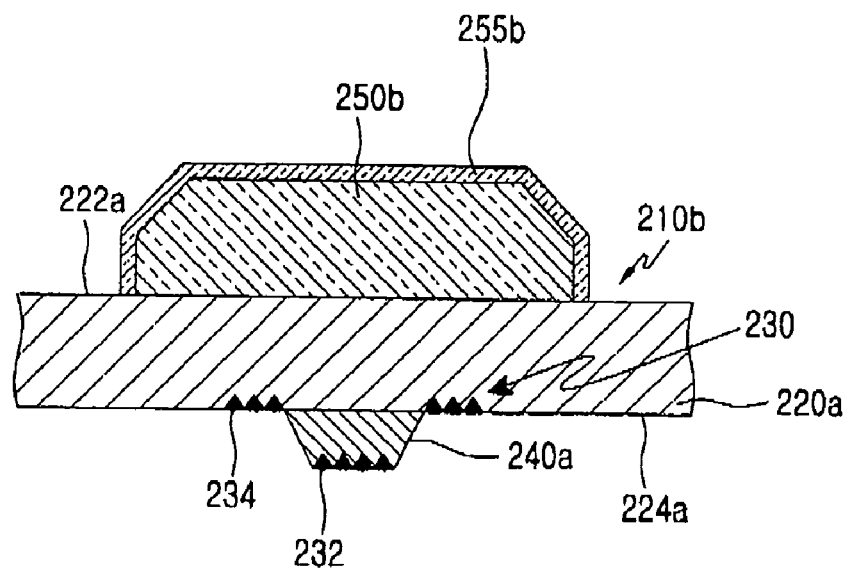
FIG. 4 is a cross-sectional view of a keypad assembly according to a second embodiment of the present invention.

FIG. 4 is a cross-sectional view of a keypad assembly according to the second embodiment of the present invention. The keypad 210b is similar in structure to the keypad 210a in FIG. 2 and different only in the shape of the key tops and the phosphor on the key tops. In the drawings, the same element is designated by the same reference numeral or character.

A plurality of key tops 250b are disposed on the upper surface 222a of the light guide panel 220a. The key tops 250b having high visible light transmissivity can be made from the same material as the light guide panel 220a or a different material such as polycarbonate or acrylic resin. In accordance with the second embodiment of the present invention, a phosphor 255b for absorbing ultraviolet light and emitting visible light is deposited on the outer surface (top and sides) of each key top 250b, and the phosphor has numbers, characters, symbols and/or figures printed on the upper surface thereof. Alternatively, the phosphor 225b can be deposited on the key top 250b with numbers, characters and/or symbols printed on the upper surface thereof.

The phosphor 255b absorbs ultraviolet light diffusely reflected by the reflective patterns 230 and transmitted to the upper surface 222a of the light guide panel 220a and the key tops 250b, which emits visible light. The visible light emitted by the phosphor 225b is projected outwardly. The key tops 250b can be fixed to the upper surface 222a of the light guide panel 220a using an adhesive.

Figure 5:
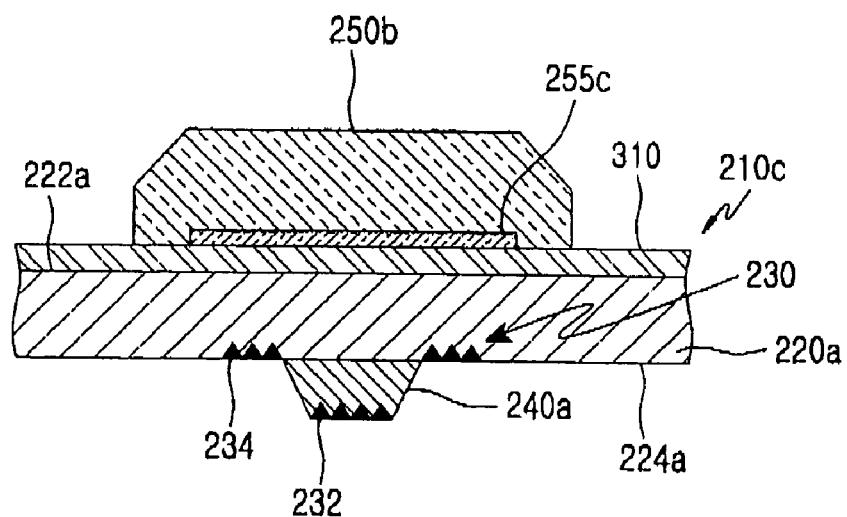
FIG. 5 is a cross-sectional view of a keypad assembly according to a third embodiment of the present invention.

FIG. 5 is a cross-sectional view of a keypad assembly according to the third embodiment of the present invention. The keypad 210c is similar in structure to the keypad 210b in FIG. 4 and different only in the inclusion of a supporting film and the shape and location of the phosphor. In the drawings, the same element is designated by the same reference numeral or character. Also, any repetitive explanation will be omitted.

The supporting film 310 is disposed on the upper surface 222a of the light guide panel 220a. The plurality of key tops 250b are disposed on the supporting film 310. Since the supporting film 310 wholly covers the upper surface 222a of the light guide panel 220a, the refractive index of the supporting film 310 should be sufficiently lower than that of the light guide panel 220a in order to maintain the total internal reflection condition. In other words, the ultraviolet light propagating inside the light guide panel 220a is totally reflected at a border between the light guide panel 220a and the supporting film 310 and a border between the light guide panel 220a and an air layer. When the key tops 250b are directly fixed to the light guide panel 220a, they may easily be separated. The supporting film 310 interposed between the light guide panel 220a and the key tops 250b can prevent such separation.

To provide a layer of air between the supporting film 310 and the light guide panel 220a, the supporting film 310 may have a surface characteristic that prevents adhesion to the upper surface 222a of the light guide panel 220a. In such a case, the edges of the supporting film 310 can be attached to those of the light guide panel 220a so as not to influence the illumination of the key tops 250b. To have such a surface characteristic, the supporting film 310 may have a rough surface or a high-slip surface coated with a release agent. The supporting film 310 can be made from a high transparent elastomer with low hardness, high elastic strain, high elastic restoring force and high UV transmissivity, preferably polyurethane or silicone.

The upper surface of the supporting film 310, excluding the portions where the key tops are disposed, can be painted in black to prevent leakage of ultraviolet light through the surface.

The plurality of key tops 250b are disposed on the upper surface 222a of the light guide panel 220a (more particularly, on the supporting film 310) and have characters, numbers, symbols and/or figures printed an upper surface thereof, respectively. The key tops 250b have high visible light transmissivity and can be made from the same material as the light guide panel 220a or a different material such as polycarbonate or acrylic resin. After formation of the key tops 250a from any of those materials using injection molding, characters, number, symbols or figures can be printed on the upper surface of each key top 250a.

A phosphor 255c may be deposited on top of the supporting film 310 to be coupled to the lower part of each key top 250b. Each key top 250b with an adhesive applied to the lower surface thereof is fixed onto the supporting film 310 so that it can completely cover the phosphor 255c deposited on the supporting film 310. Alternatively, each key top 250b may have a groove at the lower surface thereof to receive the phosphor 255c therein.

The phosphor 255c absorbs ultraviolet light diffusely reflected by the reflective patterns 230 and transmitted to the upper surface 222a of the light guide panel 220a and the supporting film 310, and emits visible light. The visible light emitted by the phosphor 255c passes through each key top 250b and is projected outwardly.

Figure 6:
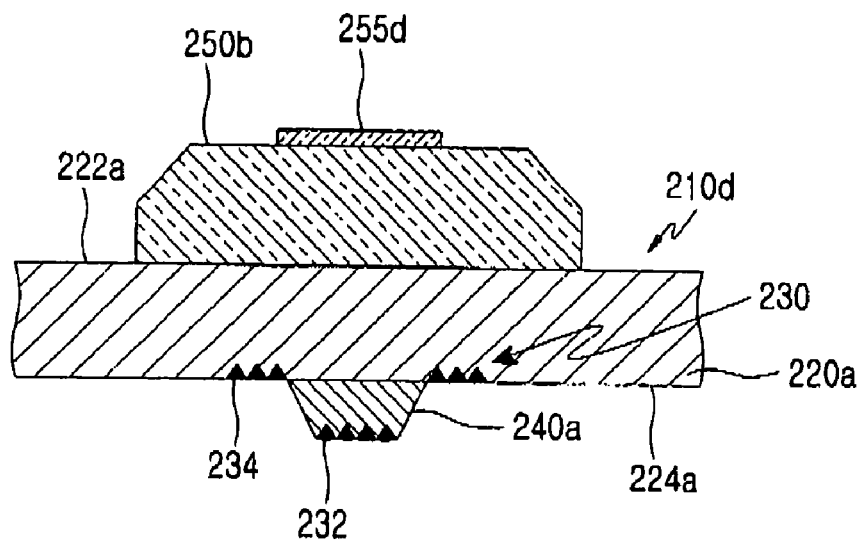
FIG. 6 is a cross-sectional view of a keypad assembly according to a fourth embodiment of the present invention.

FIG. 6 is a cross-sectional view of a keypad assembly according to the fourth embodiment of the present invention. The keypad 210d is similar in structure to the keypad 210b in FIG. 4 and different only in the shape and location of the phosphor. In the drawings, the same element is designated by the same reference numeral or character. Also, any repetitive explanation will be omitted.

The plurality of key tops 250b are disposed on the upper surface 222a of the light guide panel 220a and have characters, numbers, symbols and/or figures printed on the upper surface thereof, respectively. The key tops 250b have high visible light transmissivity and can be made from the same material as the light guide panel 220a or a different material such as polycarbonate or acrylic resin. A phosphor 255d for absorbing ultraviolet light and emitting visible light is deposited on top of each key top 250b. To be specific, after formation of the key tops 250a from any of those materials using, for example, injection molding, characters, number, symbols are printed on the upper surface of each key top 250a. Then the phosphor 255d is deposited on the upper surface of each key top 250a with a character, number or symbol printed on the upper surface thereof. The key tops 250b can be fixed to the upper surface 222a of the light guide panel 220a using an adhesive. The phosphor 255d can have the same shape as the character, number or symbol printed on each key top 250a. Alternatively, the phosphor 255d can be formed in a shape of character, number or symbol and deposited on each key top 250, without printing the character, number or symbol on the upper surface of each key top 250b.

Figure 7:
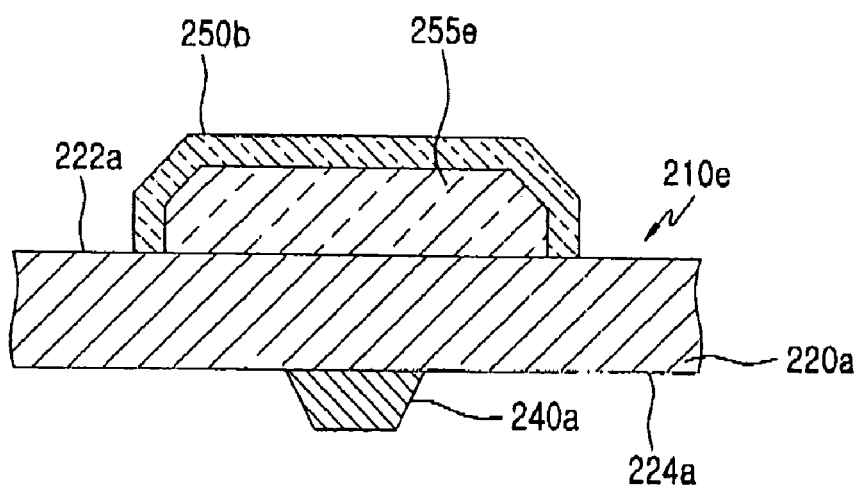
FIG. 7 is a cross-sectional view of a keypad assembly according to a fifth embodiment of the present invention.

FIG. 7 is a cross-sectional view of a keypad assembly according to the fifth embodiment of the present invention. The keypad 210e is similar in structure to the keypad 210b in FIG. 4 and different only in the shape of the phosphor and the absence of reflective patterns. In the drawings, the same element is designated by the same reference numeral or character. Also, any repetitive explanation will be omitted.

The plurality of key tops 250b are disposed on the upper surface 222a of the light guide panel 220a and have characters, numbers, symbols and/or figures printed on the upper surface thereof, respectively. The key tops 250b have high visible light transmissivity and can be made from the same material as the light guide panel 220a or a different material such as polycarbonate or acrylic resin. A phosphor 255e for absorbing ultraviolet light and emitting visible light is deposited within each key top 250b. To be specific, the phosphor 255e and the key top 250b can be formed into one piece by double injection molding, for example, in such a manner that the phosphor 255e is received in an interior space of the key top 250b. The phosphor 255e has an refractive index that can absorb the total internal reflection of the ultraviolet light passing into the light guide panel 220b. In this connection, a phosphor material having a refractive index which is equal or close to that of the light guide panel 220b can be used for the phosphor 255e. Alternatively, a material for controlling a refractive index can be added to a liquid phosphor material. The light guide panel 220a can have a refractive index ranging from 1.4 to 1.6. Since various phosphor materials having a refractive index of 1.4 to 2.5 are generally known, refractive index matching is obvious to those skilled in the art.

Ultraviolet light incident to the interior of the light guide panel 220a meet the total internal reflection condition at the border between the light guide panel 220a and the air layer, but do not at the border between the light guide panel 220a and the phosphor 255e. Ultraviolet light is thus transmitted through the border at which the total internal reflection condition is not met, and partially absorbed by the phosphor 255e. Ultraviolet light which are not absorbed by the phosphor 255e propagates inside the light guide panel 220b and contributes to the illumination of the other key tops. If the refractive index of the phosphor 255e is closer to that of the light guide panel 220a, the amount of ultraviolet light absorbed by the phosphor 255e will be increased. The phosphor 255e absorbs the ultraviolet light and emits visible light. The visible light emitted by the phosphor 255e passes through each key top 250b and is projected outwardly. Each key top 250b having the phosphor 255e therein is fixed to the upper surface 222a of the light guide panel 220a. To absorb the total internal reflection, the lower end of the phosphor 255e contacts the upper surface 222b of the light guide panel 220b.

In order to uniformly illuminate the key tops on the light guide panel 220 regardless of the distance from the light emitting devices, phosphors provided relatively close to the light emitting devices may have a different fluorescence intensity or volume than those relatively remote from the light emitting devices. To be specific, portions closer to the light emitting devices generally have a larger amount of light illuminated. Therefore, the overall illumination of light on the key tops will become even if the phosphors close to the light emitting devices have a lower fluorescence intensity and those remote from the light emitting devices have a higher fluorescence intensity.

Figure 8:
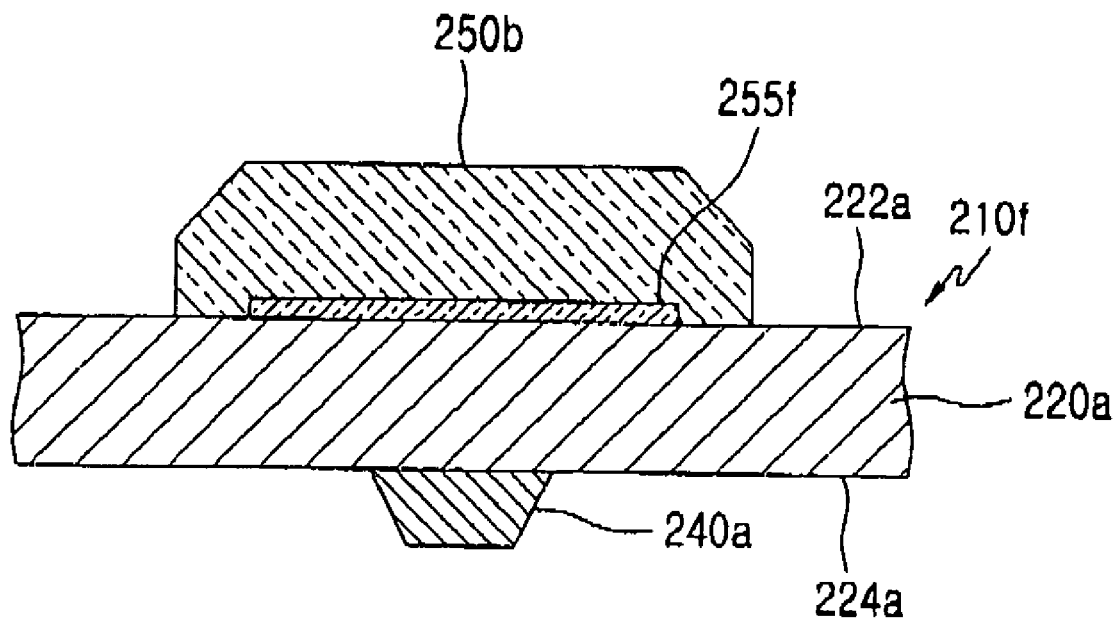
FIG. 8 is a cross-sectional view of a keypad assembly according to a sixth embodiment of the present invention.

FIG. 8 is a cross-sectional view of a keypad assembly according to the sixth embodiment of the present invention. The keypad 210f is similar in structure to the keypad 210e in FIG. 7 and different only in the shape of the phosphor. In the drawings, the same element is designated by the same reference numeral or character. Also, any repetitive explanation will be omitted.

The plurality of key tops 250b are disposed on the upper surface 222s of the light guide panel 220s and have characters, numbers, symbols and/or figures printed on the upper surface thereof, respectively. The key top 250b is made from a transparent liquid elastomer, polycarbonate or acrylic resin. After formation of the key top 250b from any of those materials using injection molding, characters, numbers and/or symbols can be printed on the upper surface of each key top 250b.

A phosphor 255f is deposited on the upper surface of the light guide panel 220s so that it can be coupled or attached to the lower part of each key top 250b. To be specific, each key top 250b with an adhesive applied to the lower surface thereof is fixed onto the light guide panel 220sb so that it can completely cover the phosphor 255f deposited on the light guide panel 220sb. Alternatively, each key top 250b may have a groove at the lower surface thereof to receive the phosphor 255f therein.

The phosphor 255f has a refractive index that can absorb the total internal reflection of the ultraviolet light passing into the light guide panel 220a and thereby absorb the ultraviolet light. The refractive index of the phosphor 255f can be equal or close to that of the light guide panel 220a. Ultraviolet light incident to the interior of the light guide panel 220a meets the total internal reflection condition at the border between the light guide panel 220b and the air layer, but does not at the border between the light guide panel 220b and the phosphor 255e. Ultraviolet light is transmitted through the border at which the total internal reflection condition is not met, and partially absorbed by the phosphor 255f. Ultraviolet light which is not absorbed by the phosphor 255f propagates inside the light guide panel 220a and contributes to the illumination of the other key tops. The phosphor 255f absorbs the ultraviolet light and emits visible light. The visible light emitted by the phosphor 255f passes through each key top 250b and is projected outwardly.

In accordance with the first through fourth embodiments of the present invention, reflective patterns are provided on the lower surface of the light guide panel to project the ultraviolet light propagating inside the light guide panel towards the key tops, thereby eliminating the need to make a phosphor contact the upper surface of the light guide panel or provide a phosphor having a refractive index equal or close to that of the light guide panel.

Although preferred embodiments of the present invention have been described for illustrative purposes, those skilled in the art will appreciate that various modifications, additions and substitutions are possible, without departing from the scope and spirit of the invention.

For example, reflective patterns can also be applied to the fifth and sixth embodiments of the present invention. To manufacture a keypad assembly having a phosphor simply disposed below or within each key top according to the fifth or sixth embodiment of the present invention and having no reflective patterns, any post-process for the uniform illumination of the key tops is not required to be done on the light guide panel, which can shorten the keypad manufacture cycle and simplify the keypad manufacture process.

Also, in the embodiments of the present invention explained above, an auxiliary printed circuit board is used to place the light emitting devices in a position facing one longitudinal end of the light guide panel. It is possible to remove the auxiliary printed circuit board and extend the longitudinal end of the light guide panel. The extended portion can be inclined in a wedge shape or simply bent to reach the upper surface of the main printed circuit board. Then the light emitting devices can be mounted on the upper surface of the main printed circuit board.

In accordance with the third, fifth and sixth embodiments of the present invention, each key top and a phosphor are formed or coupled into one piece. Alternatively, each key top can be formed to have a space at the lower end thereof to receive a phosphor therein.

As explained above, a keypad and a keypad assembly according to the present invention includes a light guide panel on which key tops are disposed. Due to the light guide panel, uniform and bright illumination of the key tops can be achieved. Also, the keypad and keypad assembly having the light guide panel can reduce the number of light emitting devices, power consumption and manufacture cost.

Moreover, the key tops in the keypad and keypad assembly according to the present invention have a means for absorbing ultraviolet light transmitted through the light guide panel and emitting visible light, thereby completely solving problems caused by the visible light leaking out through the keypad surface portions other than the key tops.

Although preferred embodiments of the present invention have been described for illustrative purposes, various modifications, additions and substitutions can be made to the present invention, without departing from the scope and spirit of the invention as disclosed in the accompanying claims, including the full scope of equivalents thereof.

What is claimed is:

1. A keypad comprising:
    a light guide panel, the interior of which ultraviolet light propagates through;
    at least one key top disposed on an upper surface of the light guide panel to absorb the ultraviolet light passing out through the light guide panel and emit visible light;
    at least one protrusion extending downwardly from a lower surface of the light guide panel; and
    at least one reflective pattern formed on the guide panel to reflect a part of the ultraviolet light propagating inside the light guide panel towards the key top.

2. The keypad as claimed in claim 1, wherein said key top is made from a phosphor material capable of absorbing ultraviolet light and emitting visible light.

3. The keypad as claimed in claim 1, wherein said key top includes a phosphor material for absorbing ultraviolet light and emitting visible light.

4. The keypad as claimed in claim 1, wherein said light guide panel is made from an elastomer material transparent to ultraviolet light.

5. The keypad as claimed in claim 4, wherein said light guide panel is made from polyurethane or silicone.

6. A keypad comprising:
    a light guide panel, the interior of which ultraviolet light propagates through;
    at least one key top disposed on an upper surface of the light guide panel to absorb the ultraviolet light passing out through the light guide panel and emit visible light;
    at least one protrusion extending downwardly from a lower surface of the light guide panel; and
    at least one reflective pattern formed on the light guide panel to reflect a part of the ultraviolet light propagating inside the light guide panel towards the key top.

7. The keypad as claimed in claim 6, wherein said key top includes a phosphor material for absorbing ultraviolet light and emitting visible light.

8. The keypad as claimed in claim 7, wherein said phosphor material is deposited on an outer surface of the key top.

9. The keypad as claimed in claim 7, wherein said phosphor material is deposited on an upper surface of the key top.

10. The keypad as claimed in claim 9, wherein said phosphor material is formed in a shape of character, number, symbol or figure.

11. The keypad as claimed in claim 6, wherein said reflective pattern is formed on the lower surface of the light guide panel, and particularly on and around the protrusion.

12. The keypad as claimed in claim 6, wherein said light guide panel is made from an elastomer material transparent to ultraviolet light.

13. The keypad as claimed in claim 12, wherein said light guide panel is made from polyurethane or silicone.

14. A keypad assembly comprising:
a keypad having a light guide panel, the interior of which ultraviolet light propagates through, at least one key top disposed on an upper surface of the light guide panel to absorb the ultraviolet light passing out through the light guide panel and emit visible light, at least one protrusion extending downwardly from a lower surface of the light guide panel, and at least one reflective pattern formed on the light guide panel to reflect a part of the ultraviolet light propagating inside the light guide panel towards the key top;
a light emitting device for coupling the ultraviolet light into the light guide panel; and
a switch board having at least one switch formed on its upper surface facing the keypad, wherein as said key top is pressed, a portion of the keypad deformed towards the switch board activates the switch.

15. The keypad assembly as claimed in claim 14, wherein said key top is made from a phosphor material capable of absorbing ultraviolet light and emitting visible light.

16. The keypad assembly as claimed in claim 14, wherein said key top includes a phosphor material for absorbing ultraviolet light and emitting visible light.

17. The keypad assembly as claimed in claim 14, wherein said phosphor material is deposited on an outer surface of the key top.

18. The keypad assembly as claimed in claim 14, wherein said phosphor material is deposited on an upper surface of the key top.

19. The keypad assembly as claimed in claim 18, wherein said phosphor material is formed in a shape of character, number, symbol or figure.

20. The keypad assembly as claimed in claim 14, wherein said light guide panel is made from an elastomer material transparent to ultraviolet light.

21. The keypad assembly as claimed in claim 20, wherein said light guide panel is made from polyurethane or silicone.

22. The keypad assembly as claimed in claim 14, wherein said reflective pattern is formed on the lower surface of the light guide panel, and particularly on and around the protrusion.

\* \* \* \* \*

UNITED STATES PATENT AND TRADEMARK OFFICE
CERTIFICATE OF CORRECTION

PATENT NO. : 7,601,926 B2 Page 1 of 1
APPLICATION NO. : 11/517897
DATED : October 13, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 225 days.

Signed and Sealed this

Fifth Day of October, 2010

David J. Kappos
*Director of the United States Patent and Trademark Office*